United States Patent
Hoshiba et al.

(10) Patent No.: US 7,532,961 B2
(45) Date of Patent: May 12, 2009

(54) POWER OUTPUT APPARATUS, METHOD OF CONTROLLING THE SAME, AND AUTOMOBILE

(75) Inventors: Takeshi Hoshiba, Toyota (JP); Mitsuhiro Nada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 566 days.

(21) Appl. No.: 10/563,137

(22) PCT Filed: Jun. 15, 2004

(86) PCT No.: PCT/JP2004/008697

§ 371 (c)(1),
(2), (4) Date: Jan. 3, 2006

(87) PCT Pub. No.: WO2005/005188

PCT Pub. Date: Jan. 20, 2005

(65) Prior Publication Data

US 2006/0161328 A1    Jul. 20, 2006

(30) Foreign Application Priority Data

Jul. 15, 2003   (JP)   ............................ 2003-197195

(51) Int. Cl.
*B60K 6/04* (2006.01)
*B60L 11/18* (2006.01)
*G06F 17/00* (2006.01)

(52) U.S. Cl. ............................ 701/22; 701/54; 701/84; 180/65.2

(58) Field of Classification Search ............ 701/22, 701/54, 70, 84; 188/110; 318/362; 180/65.2
See application file for complete search history.

(56) References Cited

U.S. PATENT DOCUMENTS 6,356,817 B1 * 3/2002 Abe ........................ 701/22

(Continued)

FOREIGN PATENT DOCUMENTS

EP        0 820 894 A2    1/1998

(Continued)

OTHER PUBLICATIONS

Spooner E., et al.: "'TORUS': A Slotless, toroidal-stator, permanent-magnet generator", IEE Proceedings B. Electrical Power Applications, Institution of Electrical Engineers, Stevenage, GB, vol. 139, No. 6, Nov. 1, 1992, pp. 497-506.

(Continued)

*Primary Examiner*—Tan Q Nguyen
(74) *Attorney, Agent, or Firm*—Kenyon & Kenyon LLP

(57) ABSTRACT

The technique of the invention sets an upper limit torque Tm1max and a lower limit torque Tm1min output from a motor generator, based on input and output restrictions Win and Wout of a battery, a motor electric power demand Pm2, an auxiliary machinery electric power demand Pcsm, and a potential loss Ploss (step S150). The technique then restricts a target revolution speed Ne* of an engine to make an output torque of the motor generator within a range of the lower limit torque Tm1min to the upper limit torque Tm1max (steps S180 to S200). This arrangement ensures output of a torque in response to a driver's requirement, while effectively preventing the battery from being charged or discharged excessively.

3 Claims, 9 Drawing Sheets

U.S. PATENT DOCUMENTS

| | | |
|---|---|---|
| 6,381,522 B1 | 4/2002 | Watanabe et al. |
| 6,549,840 B1 | 4/2003 | Mikami et al. |
| 6,647,326 B2 * | 11/2003 | Nakamori et al. ............ 701/22 |
| 7,117,071 B2 * | 10/2006 | Aoki et al. ................... 701/22 |
| 2003/0033060 A1 * | 2/2003 | Okoshi ........................ 701/22 |
| 2003/0037977 A1 | 2/2003 | Tatara et al. |

FOREIGN PATENT DOCUMENTS

| | | |
|---|---|---|
| EP | 0 909 675 A2 | 4/1999 |
| JP | 07-087615 | 3/1995 |
| JP | 09-047092 | 2/1997 |
| JP | 11-187577 | 7/1999 |
| JP | 2001-171377 | 6/2001 |
| JP | 2003-079007 | 3/2003 |

OTHER PUBLICATIONS

Japanese Office Action for Appln. No. JP 2003-197195 issued Jun. 2, 2006.

* cited by examiner

POWER OUTPUT APPARATUS, METHOD OF CONTROLLING THE SAME, AND AUTOMOBILE

This is a 371 national phase application of PCT/JP2004/008697 filed 15 Jun. 2004, claiming priority to Japanese Patent Application No. 2003-197195 filed 15 Jul. 2003, the contents of which are incorporated herein by reference.

FIELD OF THE INVENTION

The present invention relates to a power output apparatus and a corresponding method, and an automobile. More specifically, the invention relates to a power output apparatus that outputs power to a drive shaft and a method of controlling the same, and an automobile with an internal combustion engine mounted thereon.

BACKGROUND OF THE INVENTION

A proposed power output apparatus has an engine, a planetary gear unit that includes a carrier linked with a crankshaft of the engine and a ring gear linked with a drive shaft mechanically connected to an axle, a first motor that inputs and outputs power from and to a sun gear of the planetary gear unit, a second motor that inputs and outputs power from and to the drive shaft, and a battery that supplies and receives electric power to and from the first motor and the second motor (see, for example, Japanese Patent Laid-Open Gazette No. 11-187577). This power output apparatus sets an input restriction and an output restriction of the battery based on the temperature and the state of charge of the battery, and drives and controls the first motor and the second motor in the range of the settings of input restriction and output restriction.

SUMMARY OF THE INVENTION

In the prior art power output apparatus that drives and controls the first motor to regulate the driving state of the engine, a target drive point of the engine is set according to a target power to be output to the drive shaft and a target charge-discharge electric power to be used for charging the battery or to be discharged from the battery. The engine, the first motor, and the second motor are controlled to drive the engine at the target driving point and to output the target power to the drive shaft. Changing the target drive point of the engine may be required to drive the first motor and the second motor within the range of the input restriction and the output restriction of the battery.

A power output apparatus of the present invention includes an electric power input-output unit that controls operations of an internal combustion engine through input and output of electric power, and a motor that is capable of outputting power to a drive shaft. The power output apparatus, a method of controlling the power output apparatus, and a corresponding automobile of the invention aim to control the internal combustion engine, the electric power input-output unit, and the motor based on an output restriction and an input restriction of an accumulator like a secondary battery. The invention also aims to prevent the accumulator like the secondary battery from being charged or discharged excessively.

In order to attain at least part of the above aims, the power output apparatus, the method of controlling the power output apparatus, and the corresponding automobile of the invention are constructed as follows.

The present invention is directed to a power output apparatus that outputs power to a drive shaft, the power output apparatus including: an internal combustion engine; an electric power-mechanical power input-output unit that is linked with an output shaft of the internal combustion engine and with the drive shaft, and maintains or changes a driving state of the internal combustion engine and outputs at least part of power from the internal combustion engine to the drive shaft through inputs and outputs of electric power and mechanical power; a motor that is capable of inputting and outputting power from and to the drive shaft; an accumulator that is capable of supplying and receiving electric power to and from the electric power-mechanical power input-output unit and the motor; and a controller including: an input-output restriction setting module that sets an input restriction and an output restriction of the accumulator; a drivable range setting module that sets a drivable range of the electric power-mechanical power input-output unit based on the settings of input and output restrictions; a power demand setting module that sets a power demand required for the drive shaft in response to an operator's manipulation; and a driving control module that controls the internal combustion engine, the electric power-mechanical power input-output unit, and the motor to drive the electric power-mechanical power input-output unit in the setting of drivable range and to output a power corresponding to the setting of power demand to the drive shaft.

The power output apparatus of the invention sets the input and output restrictions of the accumulator, which is capable of supplying and receiving electric power to and from the electric power-mechanical power input-output unit and the motor, and sets the drivable range of the electric power-mechanical power input-output unit based on the settings of input and output restrictions. The power output apparatus controls the internal combustion engine, the electric power-mechanical power input-output unit, and the motor to drive the electric power-mechanical power input-output unit in the setting of drivable range and to output a power corresponding to the power demand, which is set in response to the operator's manipulation, to the drive shaft. Namely the internal combustion engine and the electric power-mechanical power input-output unit are controlled to drive the electric power-mechanical power input-output unit in the drivable range, while the motor is controlled to output the power corresponding to the power demand to the drive shaft. The control of the internal combustion engine, the electric power-mechanical power input-output unit, and the motor is thus under the input and output restrictions of the accumulator. This arrangement effectively prevents input and output of an excessive electric power to and from the accumulator.

In one preferable embodiment of the power output apparatus of the invention, the drivable range setting module sets the drivable range, based on the settings of input and output restrictions, a motor electric power demand to be input to and output from the motor, an auxiliary machinery electric power to be supplied from the accumulator to auxiliary machinery, and a driving state of the electric power-mechanical power input-output unit. This arrangement ensures adequate setting of the drivable range. In this embodiment, the drivable range setting module may set an allowable driving range of the internal combustion engine defined by the electric power-mechanical power input-output unit to the drivable range. The driving range of the internal combustion engine is accordingly under the input and output restrictions of the accumulator. In one preferable application of this embodiment, the drivable range setting module specifies an allowable input-output electric power range input to and output from the electric power-mechanical power input-output unit based on the settings of input and output restrictions, the motor electric power demand, and the auxiliary machinery electric power, calculates an allowable torque range output from the electric power-mechanical power input-output unit according to the specified allowable input-output electric power range and the driving state of the electric power-mechanical power input-output unit, and sets the driving range of the internal combustion engine based on the calculated allowable torque range. In another preferable application of this embodiment, the drivable range setting module sets a revolution speed range of the output shaft of the internal combustion engine to the drivable range. Regulating the revolution speed of the output shaft of the internal combustion engine enables the driving range of the internal combustion engine to be under the input and output restrictions of the accumulator.

In another preferable embodiment of the power output apparatus of the invention, the controller further includes a target driving state setting module that sets a target driving state of the internal combustion engine based on the setting of power demand. The driving control module corrects the setting of target driving state according to the drivable range and controls the internal combustion engine, the electric power-mechanical power input-output unit, and the motor to drive the internal combustion engine in the corrected target driving state. This arrangement effectively prevents input and output of an excessive electric power to and from the accumulator, which may arise due to no correction of the target driving state of the internal combustion engine. In one preferable application of this embodiment, the target driving state setting module sets at least a target revolution speed of the internal combustion engine as the target driving state. The driving control module corrects the setting of target revolution speed according to the drivable range and controls the internal combustion engine, the electric power-mechanical power input-output unit, and the motor to drive the internal combustion engine at the corrected target revolution speed.

In still another preferable embodiment of the power output apparatus of the invention, the driving control module controls the internal combustion engine, the electric power-mechanical power input-output unit, and the motor to output the power corresponding to the power demand within a range of the settings of input and output restrictions to the drive shaft. This arrangement enables the power corresponding to the power demand to be output to the drive shaft within the range of the input and output restrictions of the accumulator.

In the power output apparatus of the invention, the electric power-mechanical power input-output unit may include: a three-shaft power input-output assembly that is connected with three shafts, that is, the output shaft of the internal combustion engine, the drive shaft, and a third shaft, and specifies input and output of power from and to one residual shaft among the three shafts, based on powers input and output from and to two shafts among the three shafts; and a generator that inputs and outputs power from and to the third shaft. The electric power-mechanical power input-output unit may includes a pair-rotor generator having a first rotor, which is linked with the output shaft of the internal combustion engine, and a second rotor, which is linked with the drive shaft and rotates relative to the first rotor, the pair-rotor generator outputting at least part of the power from the internal combustion engine to the drive shaft through input and output of electric power by electromagnetic interaction between the first rotor and the second rotor.

The present invention is also directed to an automobile with an internal combustion engine mounted thereon, the automobile including: an electric power-mechanical power input-output unit that is linked with an output shaft of the internal combustion engine and with a drive shaft mechanically connected to an axle, and maintains or changes a driving state of the internal combustion engine and outputs at least part of power from the internal combustion engine to the drive shaft through inputs and outputs of electric power and mechanical power; a motor that is capable of inputting and outputting power from and to the drive shaft; an accumulator that is capable of supplying and receiving electric power to and from the electric power-mechanical power input-output unit and the motor; and a controller including: an input-output restriction setting module that sets an input restriction and an output restriction of the accumulator; a drivable range setting module that sets a drivable range of the electric power-mechanical power input-output unit based on the settings of input and output restrictions; a power demand setting module that sets a power demand required for the drive shaft in response to an operator's manipulation; and a driving control module that controls the internal combustion engine, the electric power-mechanical power input-output unit, and the motor to drive the electric power-mechanical power input-output unit in the setting of drivable range and to output a power corresponding to the setting of power demand to the drive shaft.

The automobile of the invention sets the input and output restrictions of the accumulator, which is capable of supplying and receiving electric power to and from the electric power-mechanical power input-output unit and the motor, and sets the drivable range of the electric power-mechanical power input-output unit based on the settings of input and output restrictions. The automobile of the invention further controls the internal combustion engine, the electric power-mechanical power input-output unit, and the motor to drive the electric power-mechanical power input-output unit in the setting of drivable range and to output a power corresponding to the power demand, which is set in response to the operator's manipulation, to the drive shaft. Namely the internal combustion engine and the electric power-mechanical power input-output unit are controlled to drive the electric power-mechanical power input-output unit in the drivable range, while the motor is controlled to output the power corresponding to the power demand to the drive shaft. The control of the internal combustion engine, the electric power-mechanical power input-output unit, and the motor is thus under the input and output restrictions of the accumulator. This arrangement effectively prevents input and output of an excessive electric power to and from the accumulator.

In one preferable embodiment of the automobile of the invention, the drivable range setting module sets the drivable range, based on the settings of input and output restrictions, a motor electric power demand to be input to and output from the motor, an auxiliary machinery electric power to be supplied from the accumulator to auxiliary machinery, and a driving state of the electric power-mechanical power input-output unit. This arrangement ensures adequate setting of the drivable range. In this embodiment, the drivable range setting module may set an allowable driving range of the internal combustion engine defined by the electric power-mechanical power input-output unit to the drivable range. The driving range of the internal combustion engine is accordingly under the input and output restrictions of the accumulator. In one preferable application of this embodiment, the drivable range setting module specifies an allowable input-output electric power range input to and output from the electric power-mechanical power input-output unit based on the settings of input and output restrictions, the motor electric power demand, and the auxiliary machinery electric power, calculates an allowable torque range output from the electric power-mechanical power input-output unit according to the specified allowable input-output electric power range and the driving state of the electric power-mechanical power input-output unit, and sets the driving range of the internal combustion engine based on the calculated allowable torque range. In another preferable application of this embodiment, the drivable range setting module sets a revolution speed range of the output shaft of the internal combustion engine to the drivable range. Regulating the revolution speed of the output shaft of the internal combustion engine enables the driving range of the internal combustion engine to be under the input and output restrictions of the accumulator.

In another preferable embodiment of the automobile of the invention, the controller further includes a target driving state setting module that sets a target driving state of the internal combustion engine based on the setting of power demand. The driving control module corrects the setting of target driving state according to the drivable range and controls the internal combustion engine, the electric power-mechanical power input-output unit, and the motor to drive the internal combustion engine in the corrected target driving state. This arrangement effectively prevents input and output of an excessive electric power to and from the accumulator, which may arise due to no correction of the target driving state of the internal combustion engine. In one preferable application of this embodiment, the target driving state setting module sets at least a target revolution speed of the internal combustion engine as the target driving state. The driving control module corrects the setting of target revolution speed according to the drivable range and controls the internal combustion engine, the electric power-mechanical power input-output unit, and the motor to drive the internal combustion engine at the corrected target revolution speed.

The present invention is further directed to a control method of controlling a power output apparatus, the power output apparatus including: an internal combustion engine; an electric power-mechanical power input-output unit that is linked with an output shaft of the internal combustion engine and with a drive shaft, and maintains or changes a driving state of the internal combustion engine and outputs at least part of power from the internal combustion engine to the drive shaft through inputs and outputs of electric power and mechanical power; a motor that is capable of inputting and outputting power from and to the drive shaft; and an accumulator that is capable of supplying and receiving electric power to and from the electric power-mechanical power input-output unit and the motor, the control method including the steps of: (a) setting an input restriction and an output restriction of the accumulator; (b) setting a drivable range of the electric power-mechanical power input-output unit, based on the settings of input and output restrictions, a motor electric power demand to be input to and output from the motor, an auxiliary machinery electric power to be supplied from the accumulator to auxiliary machinery, and a driving state of the electric power-mechanical power input-output unit; (c) setting a power demand required for the drive shaft in response to an operator's manipulation; and (d) controlling the internal combustion engine, the electric power-mechanical power input-output unit, and the motor to drive the electric power-mechanical power input-output unit in the setting of drivable range and to output a power corresponding to the setting of power demand to the drive shaft.

The control method of the invention sets the input and, output restrictions of the accumulator, which is capable of supplying and receiving electric power to and from the electric power-mechanical power input-output unit and the motor, and sets the drivable range of the electric power-mechanical power input-output unit based on the settings of input and output restrictions. The method further controls the internal combustion engine, the electric power-mechanical power input-output unit, and the motor to drive the electric power-mechanical power input-output unit in the setting of drivable range and to output a power corresponding to the power demand, which is set in response to the operator's manipulation, to the drive shaft. Namely the internal combustion engine and the electric power-mechanical power input-output unit are controlled to drive the electric power-mechanical power input-output unit in the drivable range, while the motor is controlled to output the power corresponding to the power demand to the drive shaft. The control of the internal combustion engine, the electric power-mechanical power input-output unit, and the motor is thus under the input and output restrictions of the accumulator. This arrangement effectively prevents input and output of an excessive electric power to and from the accumulator.

In one preferable embodiment of the invention, the control method further includes the step of setting a target driving state of the internal combustion engine based on the setting of power demand, prior to the step (d). The step (d) corrects the setting of target driving state according to the drivable range and controls the internal combustion engine, the electric power-mechanical power input-output unit, and the motor to drive the internal combustion engine in the corrected target driving state.

DETAILED DESCRIPTION

Figure 1:
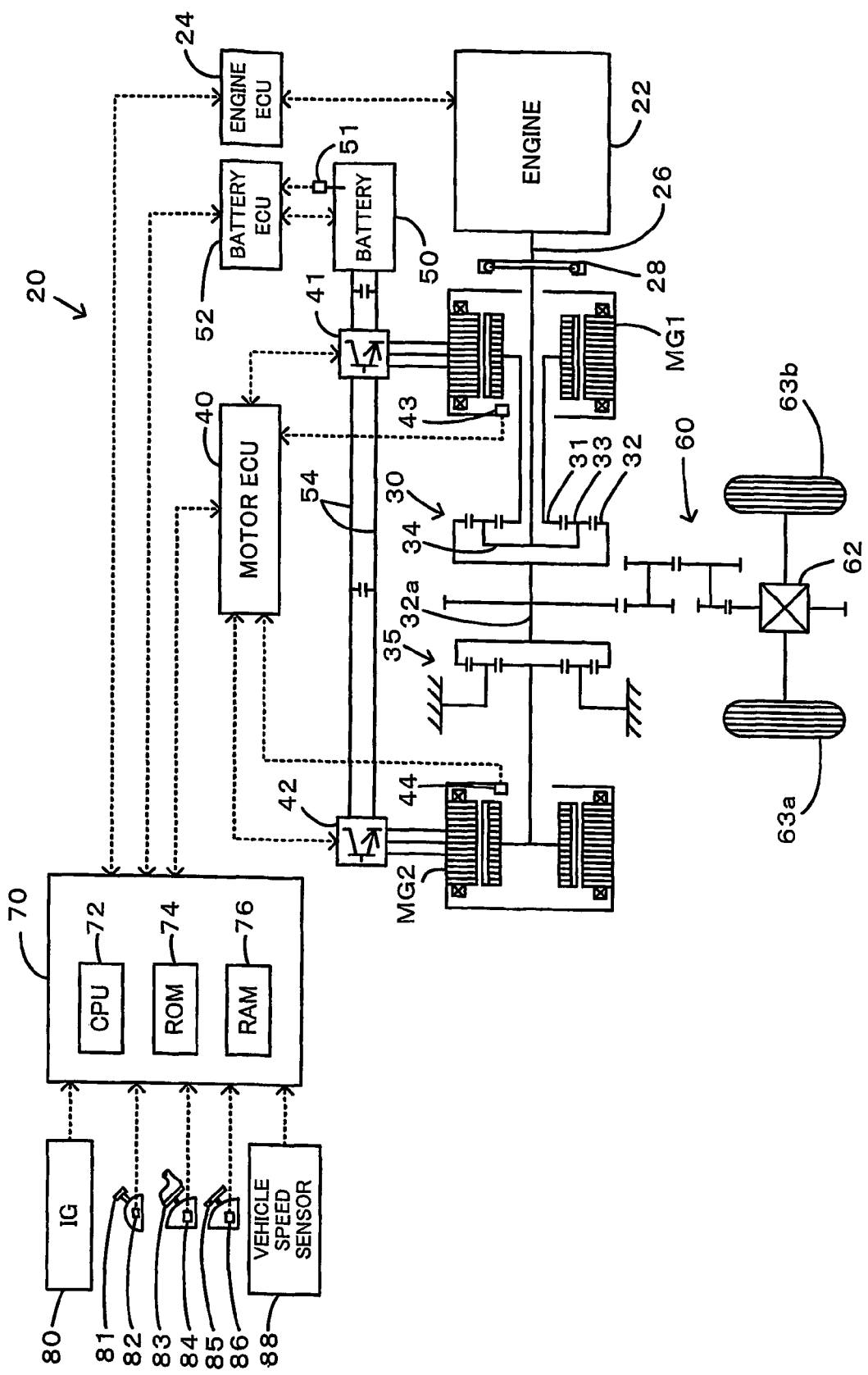
FIG. 1 schematically illustrates the construction of a hybrid vehicle 20 in one embodiment.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that consumes a hydrocarbon fuel, such as gasoline or light oil, to output power and is under control of an engine electronic control unit (hereafter referred to as engine ECU) 24. The engine ECU 24 receives input signals from various sensors detecting the driving conditions of the engine 22 and carries out operation control including fuel injection control, ignition control, and intake air flow regulation. The engine ECU 24 communicates with the hybrid electronic control unit 70 and receives control signals from the hybrid electronic control unit 70 to control the operations of the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via the ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is finally transmitted to the driving wheels 63a, 63b via the gear mechanism 60 and differential gear 62 from ring gear shaft 32a.

Both of the motors MG1 and MG2 are constructed as known synchronous generator motors, which are driven as an electric generator as well as an electric motor. The motors MG1 and MG2 transmit electric power from and to a battery 50 via inverters 41 and 42. A power line 54 connecting the inverters 41 and 42 with the battery 50 includes a positive terminal bus line and a negative terminal bus line shared by the two inverters 41 and 42. This arrangement enables the electric power generated by one of the motors MG1 and MG2 to be consumed by the other motor. The battery 50 is charged with the excess electric power of the motor MG1 or the motor MG2 and is discharged to supplement the insufficient electric power of the motor MG1 or the motor MG2. The battery 50 is neither charged not discharged when there is an electric power balance by the motors MG1 and MG2. The motors MG1 and MG2 are both driven and controlled by a motor electronic control unit (hereinafter referred to as motor ECU) 40. The motor ECU 40 receives signals required for driving and controlling the motors MG1 and MG2, for example, signals from rotational position detection sensors 43 and 44 that detect the rotational positions of rotors, in the motors MG1 and MG2 and values of phase electric currents supplied to the motors MG1 and MG2 and detected by non-illustrated electric current sensors. The motor ECU 40 outputs switching control signals to the inverters 41 and 42. The motor ECU 40 communicates with the hybrid electronic control unit 70 and drives and controls the motors MG1 and MG2 in response to control signals from the hybrid electronic control unit 70 while outputting data regarding the driving conditions of the motors MG1 and MG2 to the hybrid electronic control unit 70 according to the requirements.

The battery 50 is controlled by a battery electronic control unit (hereinafter referred to as battery ECU) 52. The battery ECU 52 receives signals required for controlling the battery 50, for example, a value of inter-terminal voltage measured by a non-illustrated voltage sensor disposed between terminals of the battery 50, a value of charge discharge electric current measured by a non-illustrated electric current sensor attached to the power line 54 connecting with an output terminal of the battery 50, and a battery temperature measured by a non-illustrated temperature sensor attached to the battery 50. The battery ECU 52 outputs data regarding the conditions of the battery 50 to the hybrid electronic control unit 70 via communication according to the requirements. The battery ECU 52 computes a state of charge. (SOC) from an accumulated value of the charge discharge electric current measured by the electric current sensor for controlling the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a required torque, which is to be output to the ring gear shaft 32a or the drive shaft, based on the accelerator opening Acc corresponding to the driver's step-on amount of the accelerator pedal 83 and the vehicle speed V. The engine 22 and the motors MG1 and MG2 are under operation control to enable power corresponding to the calculated required torque to be actually output to the ring gear shaft 32a. The operation control of the engine 22 and the motors MG1 and MG2 has multiple modes, a torque conversion drive mode, a charge-discharge drive mode, and a motor drive mode. In the torque conversion drive mode, the engine 22 is under operation control to output a power equivalent to the required power. The motors MG1 and MG2 are driven and controlled to cause the total power output from the engine 22 to be subjected to the torque conversion by means of the power distribution and integration mechanism 30 and the motors MG1 and MG2 and to be output to the ring gear shaft 32a. In the charge-discharge drive mode, the engine 22 is under operation control to output a power equivalent to the sum of the required power and an electric power used for charging and discharging the battery 50. The motors MG1 and MG2 are driven and controlled to cause all or part of the power output from the engine 22 with a charge or a discharge of the battery 50 to be subjected to the torque conversion by means of the power distribution and integration mechanism 30 and the motors MG1 and MG2 and to be output as the required power to the ring gear shaft 32a. In the motor drive mode, the operation of the engine 22 is at a stop, while the motor MG2 is driven and controlled to output a power equivalent to the required power to the ring gear shaft 32a.

Figure 2:
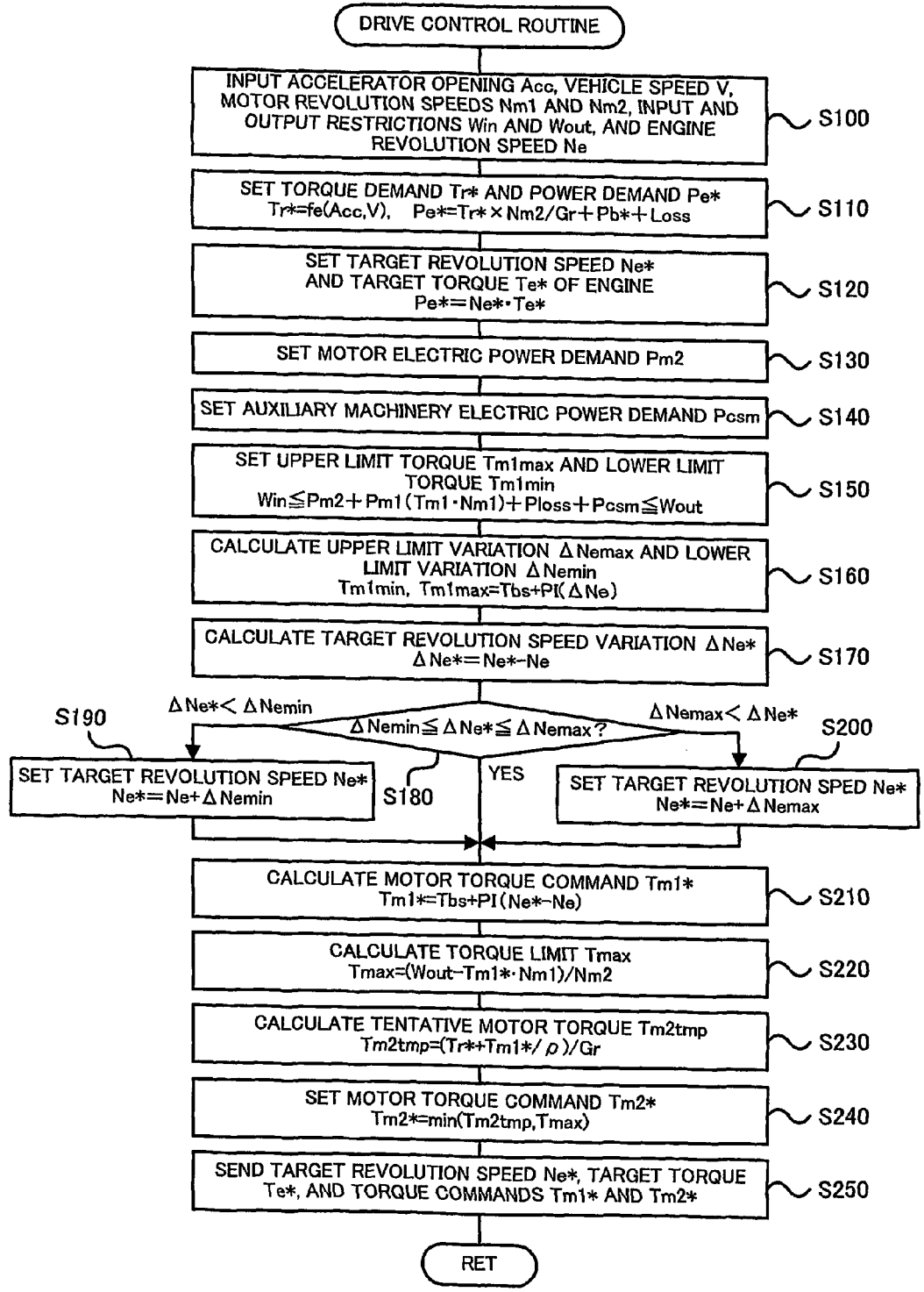
FIG. 2 is a flowchart showing a drive control routine executed by a hybrid electronic control unit 70.

The following describes the operations of the hybrid vehicle 20 of the embodiment constructed as discussed above, especially the operation under input and output restrictions of the battery 50. FIG. 2 is a flowchart showing a drive control routine executed by the hybrid electronic control unit 70. This routine is carried out repeatedly at preset time intervals (for example, at every 8 msec).

Figure 3:
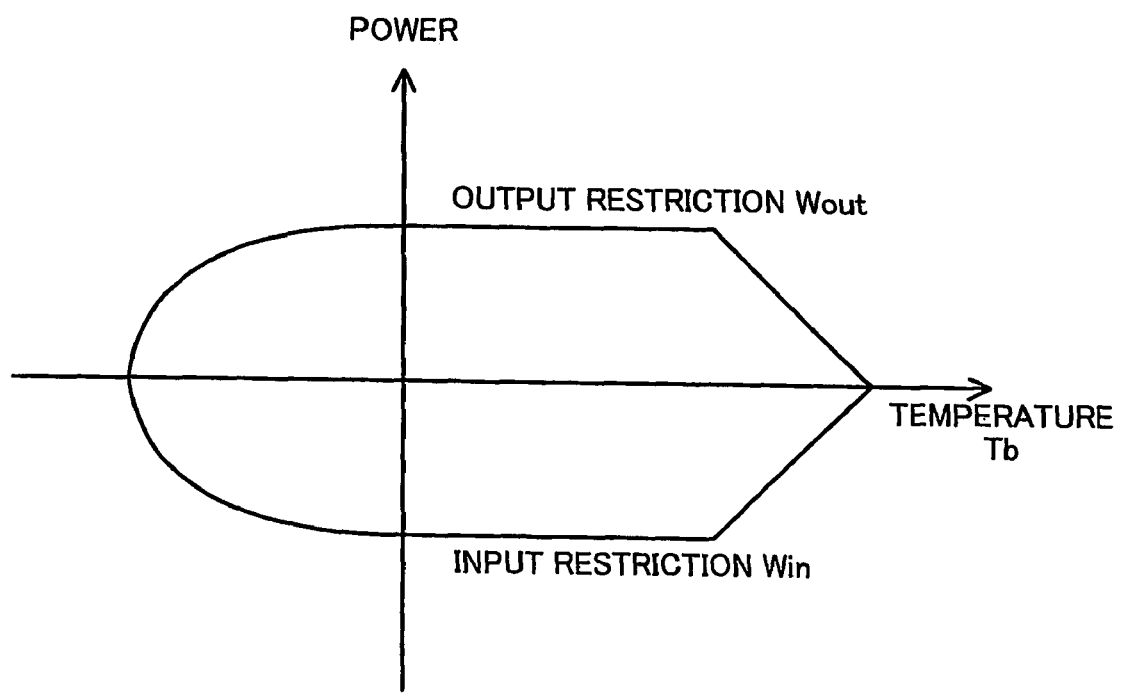
FIG. 3 shows variations in input restriction Win and output restriction Wout against battery temperature Tb of a battery 50.
Figure 4:
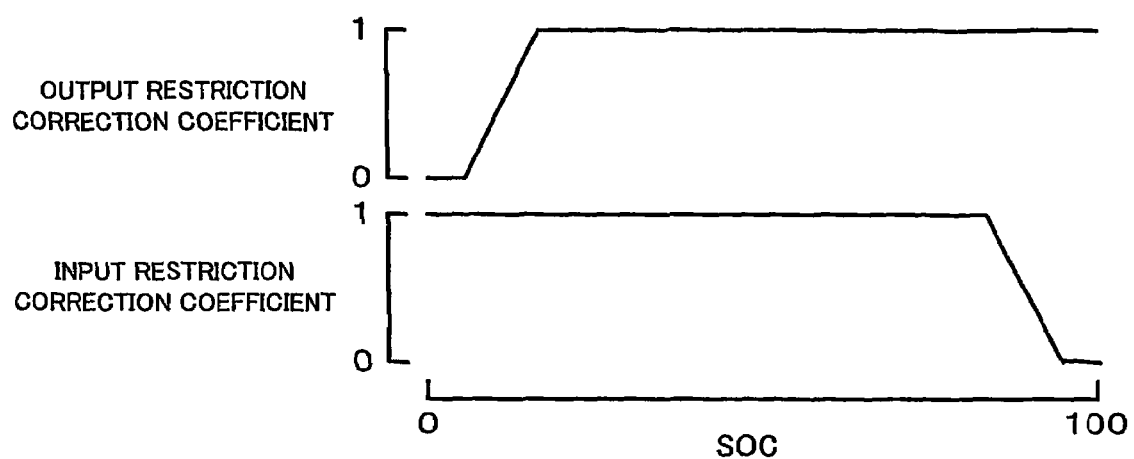
FIG. 4 shows variations in output restriction correction coefficient and input restriction correction coefficient against state of charge (SOC) of the battery 50.

When the drive control routine starts, the CPU 72 of the hybrid electronic control unit 70 first inputs various data required for control, that is, the accelerator opening Acc from the accelerator pedal position sensor 84, the vehicle speed V from the vehicle speed sensor 88, revolution speeds Nm1 and Nm2 of the motors MG1 and MG2, input and output restrictions Win and Wout of the battery 50, and a revolution speed Ne of the engine 22 (step S100). The revolution speeds Nm1 and Nm2 of the motors MG1 and MG2 are computed from rotational positions of rotors in the motors MG1 and MG2 detected by rotational position detection sensors 43 and 44 and are input from the motor ECU 40 via communication. The revolution speed Ne of the engine 22 is calculated in response to a signal from a non-illustrated crank position sensor attached to the crankshaft 26 and is input from the engine ECU 24 via communication. The input and output restrictions Win and Wout of the battery 50 are set according to a battery temperature Tb of the battery 50 measured by a temperature sensor 51 and a state of charge (SOC) of the battery 50 and are input from the battery ECU 52 via communication. One concrete procedure specifies reference values of the input and output restrictions Win and Wout based on the observed battery temperature Tb, determines an output restriction correction coefficient and an input restriction correction coefficient based on the state of charge (SOC) of the battery 50, and multiplies the specified reference values of the input and output restrictions Win and Wout by the respective correction coefficients to set the input and output restrictions Win and Wout of the battery 50. FIG. 3 shows variations in input restriction Win and output restriction Wout against the battery temperature Tb. FIG. 4 shows variations in output restriction correction coefficient and input restriction correction coefficient against the state of charge (SOC) of the battery 50.

Figure 5:
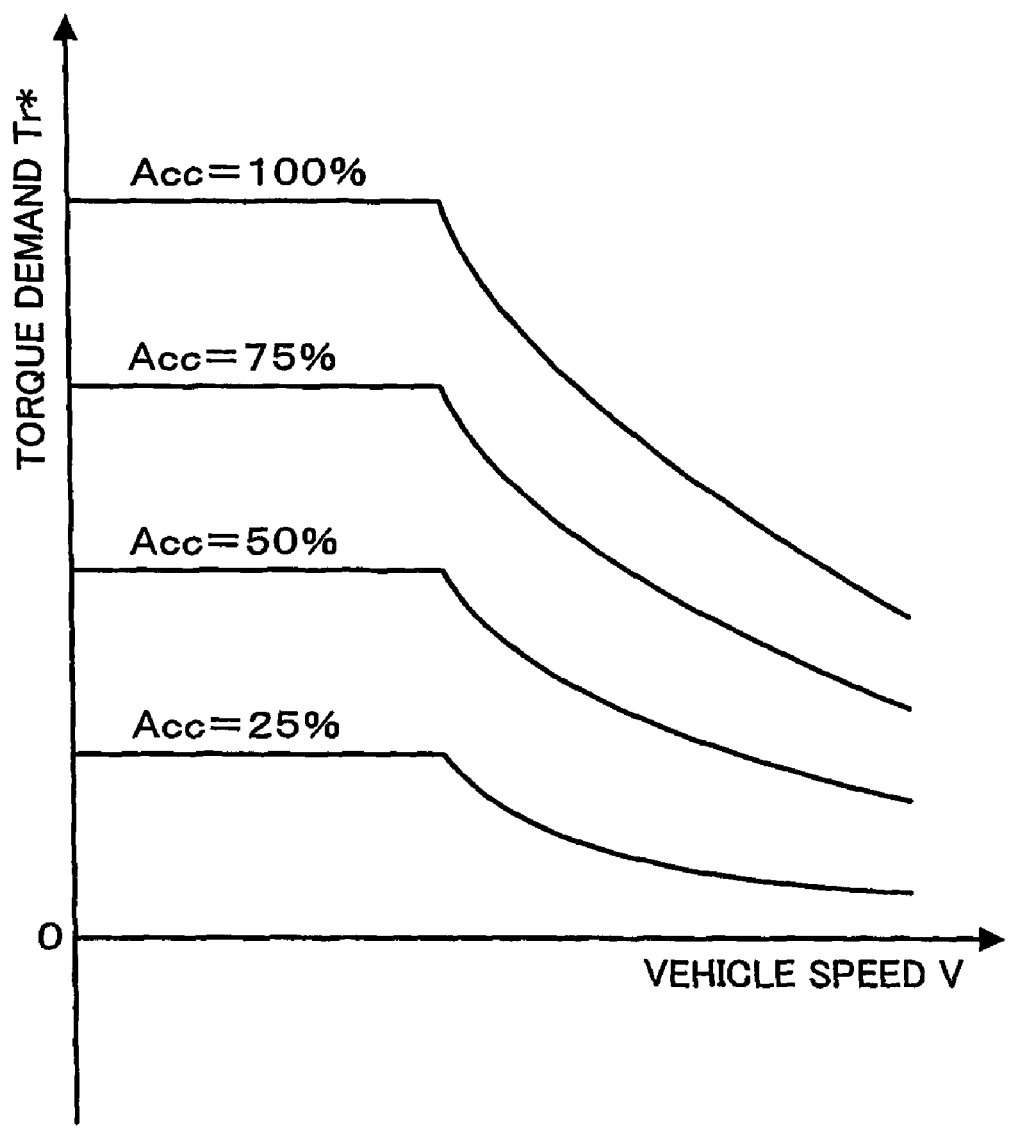
FIG. 5 shows one example of a torque demand setting map.

After the input of these data, the CPU 72 sets a torque demand Tr* to be output to the ring gear shaft 32a or the drive shaft linked with the drive wheels 63a and 63b as the torque required for the vehicle and a power demand Pe* to be output from the engine 22, based on the inputs of the accelerator opening Acc and the vehicle speed V (step S110). In the structure of this embodiment, variations in torque demand Tr* against the accelerator opening Acc and the vehicle speed V are specified in advance and stored as a torque demand setting map in the ROM 74. The procedure of the embodiment reads and sets the torque demand Tr* corresponding to the given accelerator opening Acc and the given vehicle speed V from the stored torque demand setting map. FIG. 5 shows an example of the torque demand setting map. The power demand Pe* is calculated as the sum of the product of the setting of the torque demand Tr* and a revolution speed Nr of the ring gear shaft 32a, a charge-discharge power demand Pb* of the battery 50, and a potential loss 'Loss'. The revolution speed Nr of the ring gear shaft 32a may be obtained by multiplying the vehicle speed V by a conversion coefficient k or by dividing the revolution speed Nm2 of the motor MG2 by a gear ratio Gr of the reduction gear 35.

Figure 6:
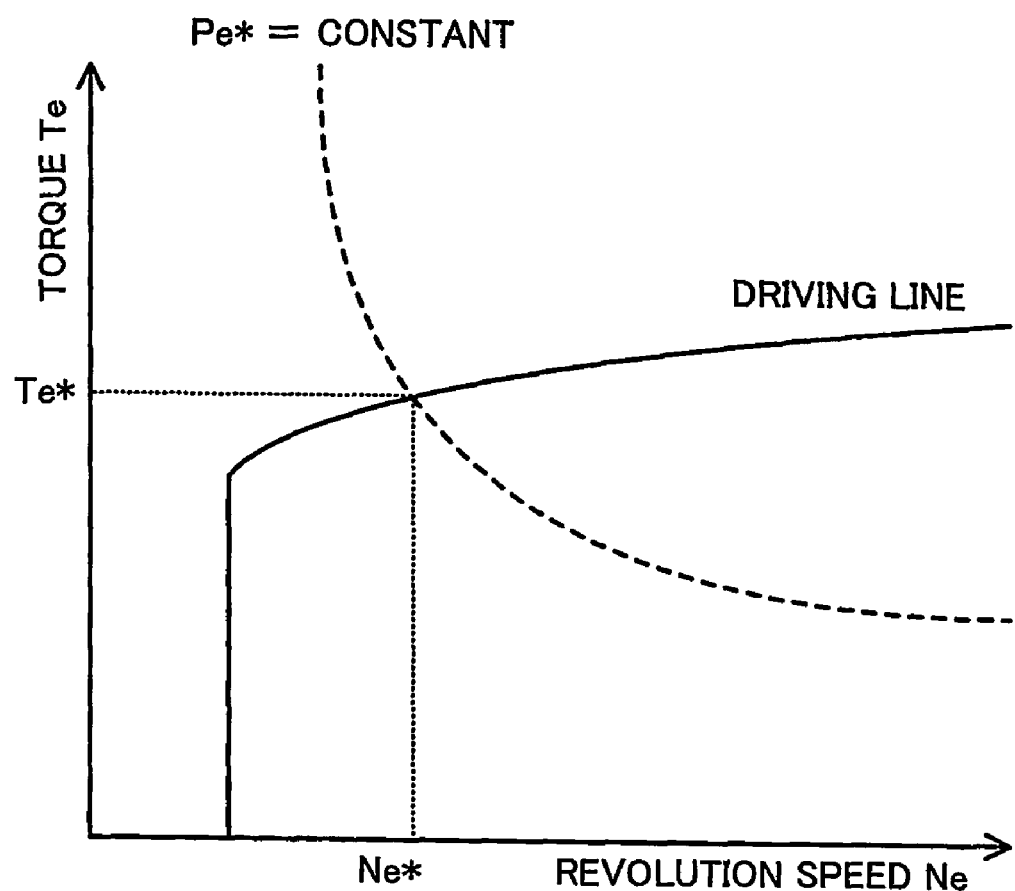
FIG. 6 shows one example of a driving line of an engine 22 and a process of setting target revolution speed Ne* and target torque Te*.

The CPU 72 subsequently sets a target revolution speed Ne* and a target torque Te* of the engine 22, based on the setting of the power demand Pe* (step S120). Here the target revolution speed Ne* and the target torque Te* are set according to a driving line for efficiently driving the engine 22 and the setting of the power demand Pe*. An example of the driving line of the engine 22 and the process of setting the target revolution speed Ne* and the target torque Te* are shown in FIG. 6. As illustrated, the target revolution speed Ne* and the target torque Te* are obtained as the intersection of the driving line and a curve of constant engine power demand Pe* (=Ne*×Te*).

The CPU 72 then sets a motor electric power demand Pm2 as an electric power demanded for output of a minimum required level of mechanical power from the motor MG2 and an auxiliary machinery electric power demand Pcsm as an electric power demanded for actuation of auxiliary machinery that receive power supply from the battery 50 (that is, auxiliary machinery mounted on the vehicle like an air compressor) (steps S130 and S140). The motor electric power demand Pm2 is set as an essential torque to be output from the motor MG2, for example, a torque as a reactive force required for the ring gear shaft 32a or the drive shaft in response to output of a torque from the motor MG1 in the course of cranking the engine 22. The auxiliary machinery electric power demand Pcsm is set according to the on-off state and the loading state of the auxiliary machinery.

After setting the motor electric power demand Pm2 and the auxiliary machinery electric power demand Pcsm, an upper limit torque Tm1max and a lower limit torque Tm1min are set as upper and lower limits of torque output from the motor MG1, based on the input and output restrictions Win and Wout, the motor electric power demand Pm2, the auxiliary machinery electric power demand Pcsm, a potential loss Ploss, and the revolution speed Nm1 of the motor MG1 (step S150). The concrete procedure substitutes an electric power Pm1 of the motor MG1 (=torque×revolution speed Nm1) into Equation (1) given below and derives Equations (2) and (3) given below from Equation (1) to calculate the upper limit torque Tm1max and the lower limit torque Tm1min:

$$Win \leq Pm2 + Pm1 + Ploss + Pcsm \leq Wout \quad (1)$$

$$Tm1min = \{Win - (Pm2 + Ploss + Pcsm)\}/Nm1 \quad (2)$$

$$Tm1max = \{Wout - (Pm2 + Ploss + Pcsm)\}/Nm1 \quad (3)$$

The CPU 72 subsequently calculates upper and lower limits ΔNemax and ΔNemin of variations in target revolution speed Ne* (upper limit variation and lower limit variation) with respect to the revolution speed Ne of the engine according to Equation (4) given below, which is used for feedback control of the motor MG1, in order to drive the engine 22 at the target revolution speed Ne* when the engine 22 is currently driven at the revolution speed Ne against the settings of the upper limit torque Tm1max and the lower limit torque Tm1min (step S160). In Equation (4), Tbs in the first term, k1 in the second term, and k2 in the third term on the right side respectively denote a base term, a gain of a proportional term, and a gain of an integral term. ΔNe represents a difference (Ne*−Ne) between the target revolution speed Ne* and the current revolution speed Ne. The proportional term instantly responds to the difference between the target revolution speed Ne* and the current revolution speed Ne, while the integral term has only a minute variation in each cycle. The procedure of the embodiment thus regards the base term and the integral term as fixed values and calculates the upper limit variation $\Delta Nemax$ and the lower limit variation $\Delta Nemin$ according to Equations (5) and (6) given below:

$$Tm1 = Tbs + k1 \cdot \Delta Ne + k2 \cdot \int \Delta Ne\, dt \qquad (4)$$

$$\Delta Nemin = (Tm1min - Tbs - k2 \cdot \int \Delta Ne\, dt)/K1 \qquad (5)$$

$$\Delta Nemax = (Tm1max - Tbs - k2 \cdot \int \Delta Ne\, dt)/k1 \qquad (6)$$

The CPU 72 then subtracts the current revolution speed Ne from the target revolution speed Ne* to calculate a target revolution speed variation $\Delta Ne^*$ (step S170) and compares the calculated target revolution speed variation $\Delta Ne^*$ with the upper limit variation $\Delta Nemax$ and the lower limit variation $\Delta Nemin$ (step S180). When the target revolution speed variation $\Delta Ne^*$ is less than the lower limit variation $\Delta Nemin$, the sum of the current revolution speed Ne and the lower limit variation $\Delta Nemin$ is set to the target revolution speed Ne* (step S190) When the target revolution speed variation $\Delta Ne^*$ is greater than the upper limit variation $\Delta Nemax$, the sum of the current revolution speed Ne and the upper limit variation $\Delta Nemax$ is set to the target revolution speed Ne* (step S200). When the target revolution speed variation $\Delta Ne^*$ is not less than the lower limit variation $\Delta Nemin$ and not greater than the upper limit variation $\Delta Nemax$, resetting of the target revolution speed Ne* is not carried out. Such resetting of the target revolution speed Ne* causes the output torque of the motor MG1, which is required to change the revolution speed of the engine 22 from the current revolution speed Ne to the target revolution speed Ne*, to be in the range of the lower limit torque Tm1min to the upper limit torque Tm1max.

Figure 7:
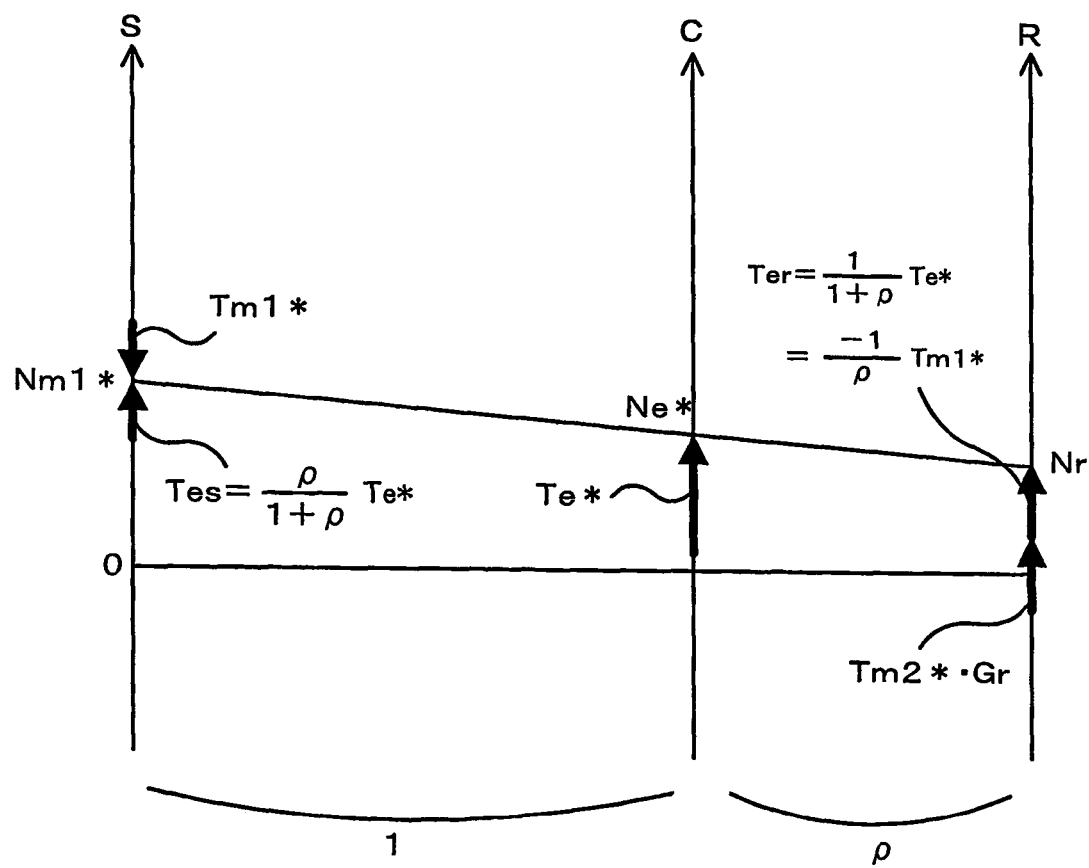
FIG. 7 is an alignment chart showing a dynamic relation with respect to rotational elements in a power distribution integration mechanism 30.

The CPU 72 calculates a torque command Tm1* of the motor MG1 from the difference between the preset or reset target revolution speed Ne* and the current revolution speed Ne of the engine 22 according to Equation (4) given above (step S210). The CPU 72 subsequently divides a difference between the output restriction Wout of the battery 50 and a power consumption (generated power) of the motor MG1, which is the product of the calculated torque command Tm1* of the motor MG1 and the current revolution speed Nm1 of the motor MDG1, by the current revolution speed Nm2 of the motor MG2 according to Equation (7) given below to calculate a torque limit Tmax as an upper limit output torque from the motor MG2 (step S220). The CPU 72 also calculates a tentative motor torque Tm2tmp as a torque to be output from the motor MG2 from the torque demand Tr*, the torque command Tm1*, and the gear ratio ρ of the power distribution integration mechanism 30 according to Equation (8) given below (step S230), and sets the smaller between the calculated torque limit Tmax and the calculated tentative motor torque Tm2tmp to a torque command Tm2* of the motor MG2 (step S240). Equation (8) shows a dynamic relation of the rotational elements in the power distribution integration mechanism 30. FIG. 7 is an alignment chart showing a dynamic relation between the revolution speed and the torque with respect to the rotational elements in the power distribution integration mechanism 30. An axis S shows the revolution speed of the sun gear 31 that is equal to the revolution speed Nm1 of the motor MG1. An axis C shows the revolution speed of the carrier 34 that is equal to the revolution speed Ne of the engine 22. An axis R shows the revolution speed Nr of the ring gear 32 that is obtained by multiplying the revolution speed Nm2 of the motor MG2 by the gear ratio Gr of the reduction gear 35. Equation (8) is easily derived from this alignment chart. Two thick arrows on the axis R respectively represent a torque acting on the ring gear shaft 32a as a torque Te* output from the engine 22 is transmitted via the power distribution integration mechanism 30 while the engine 22 is steadily driven at a specific drive point defined by the target torque Te* and the target revolution speed Ne*, and a torque acting on the ring gear shaft 32a as a torque Tm2* output from the motor MG2 is transmitted via the reduction gear 35. Setting the torque command Tm2* of the motor MG2 in this manner enables the torque demand Tr*, which is to be output to the ring gear shaft 32a or the drive shaft, to be set as a limited torque within the range of the output restriction of the battery 50.

$$Tmax = (Wout - Tm1^* \cdot Nm1)/Nm2 \qquad (7)$$

$$Tm2tmp = (Tr^* + Tm1^*/\rho)/Gr \qquad (8)$$

After setting the target revolution speed Ne* and the target torque Te* of the engine 22 and the torque commands Tm1* and Tm2* of the motors MG1 and MG2, the CPU 72 sends the target revolution speed Ne* and the target torque Te* of the engine 22 to the engine ECU 24 and the torque commands Tm1* and Tm2* of the motors MG1 and MG2 to the motor ECU 40 (step S250) and exits from this drive control routine. The engine ECU 24 receives the target revolution speed Ne* and the target torque Te* and carries out fuel injection control and ignition control of the engine 22 to drive the engine 22 at a drive point defined by the target revolution speed Ne* and the target torque Te*. The motor ECU 40 receives the torque commands Tm1* and Tm2* and carries out switching control of switching elements in the inverters 41 and 42 to drive the motor MG1 with the torque command Tm1* and to drive the motor MG2 with the torque command Tm2*.

As described above, the hybrid vehicle 20 of the embodiment sets the upper limit torque Tm1max and the lower limit torque Tm1min output from the motor MG1, based on the input and output restrictions Win and Wout of the battery 50, the motor electric power demand Pm2 of the motor MG2, the auxiliary machinery electric power demand Pcms, the potential loss Ploss, and the revolution speed Nm1 of the motor MG1. The hybrid vehicle 20 resets the target revolution speed Ne* of the engine 22 to make the output torque of the motor MG1 within the range of the lower limit torque Tm1min to the upper limit torque Tm1max and drives the engine 22, while actuating the motors MG1 and MG2. Driving of the engine 22 and actuation of the motors MG1 and MG2 are thus under the input and output restrictions Win and Wout of the battery 50. This arrangement effectively prevents the battery 50 from being charged or discharged excessively. The torque demand Tr* required by the driver is output to the ring gear shaft 32a or the drive shaft as the limited torque within the range of the input and output restrictions Win and Wout of the battery 50. The arrangement of the embodiment thus ensures output of a torque corresponding to the driver's required level, while effectively prevents the battery 50 from being charged or discharged excessively.

In the hybrid vehicle 20 of the embodiment, the upper limit torque Tm1max and the lower limit torque Tm1min output from the motor MG1 are set, based on the input and output restrictions Win and Wout of the battery 50, the motor electric power demand Pm2 of the motor MG2, the auxiliary machinery electric power demand Pcms, the potential loss Ploss, and the revolution speed Nm1 of the motor MG1. It is not essential to calculate the motor electric power demand Pm2 as the electric power demanded for output of the minimum required level of mechanical power from the motor MG2. The motor electric power demand Pm2 may be calculated from a minimum electric power demand required for output of the minimum required level of mechanical power from the motor MG2, for example, by adding a correction electric power to the minimum electric power demand or by multiplying the minimum electric power demand by a correction coefficient. The motor electric power demand Pm2 may otherwise be set by any of diverse techniques, for example, set equal to a current power consumption by the motor MG2 or calculated by multiplying the current power consumption by a correction coefficient.

The hybrid vehicle 20 of the embodiment sets the upper limit torque Tm1max and the lower limit torque Tm1min output from the motor MG1 based on the input and output restrictions Win and Wout of the battery 50 and resets the target revolution speed Ne* of the engine 22 to make the output torque of the motor MG1 within the range of the lower limit torque Tm1min to the upper limit torque Tm1max. One modified procedure may directly reset the target revolution speed Ne* of the engine 22 based on the input and output restrictions Win and Wout of the battery 50, without specifying the upper limit torque Tm1max and the lower limit torque Tm1min.

The hybrid vehicle 20 of the embodiment utilizes the observed revolution speed Nm1 of the motor MG1 to set the upper limit torque Tm1max and the lower limit torque Tm1min output from the motor MG1 based on the input and output restrictions Win and Wout of the battery 50. One modified procedure may estimate a future revolution speed of the motor MG1 expected after the activation interval of the drive control routine discussed above or a time period approximate to the activation interval and utilize the estimated future revolution speed to set the upper limit torque Tm1max and the lower limit torque Tm1min.

The hybrid vehicle 20 of the embodiments uses Equation (4), which is the relational expression of feedback control including the base term, the proportional term, and the integral term, to calculate the upper limit variation ΔNemax and the lower limit variation ΔNemin from the upper limit torque Tm1max and the lower limit torque Tm1min or to set the torque command Tm1* from the target revolution speed Ne* and the observed revolution speed Ne. Diversity of other relational expressions of feedback control may be used for the same purpose: for example, a relational expression that excludes the integral term and includes only the base term and the proportional term, a relational expression that excludes the base term and includes only the proportional term and the integral term, or a relational expression that includes a differential term in addition to the base term, the proportional term, and the integral term. Any other suitable relational expressions of control other than feedback control may also be used for the same purpose.

Figure 8:
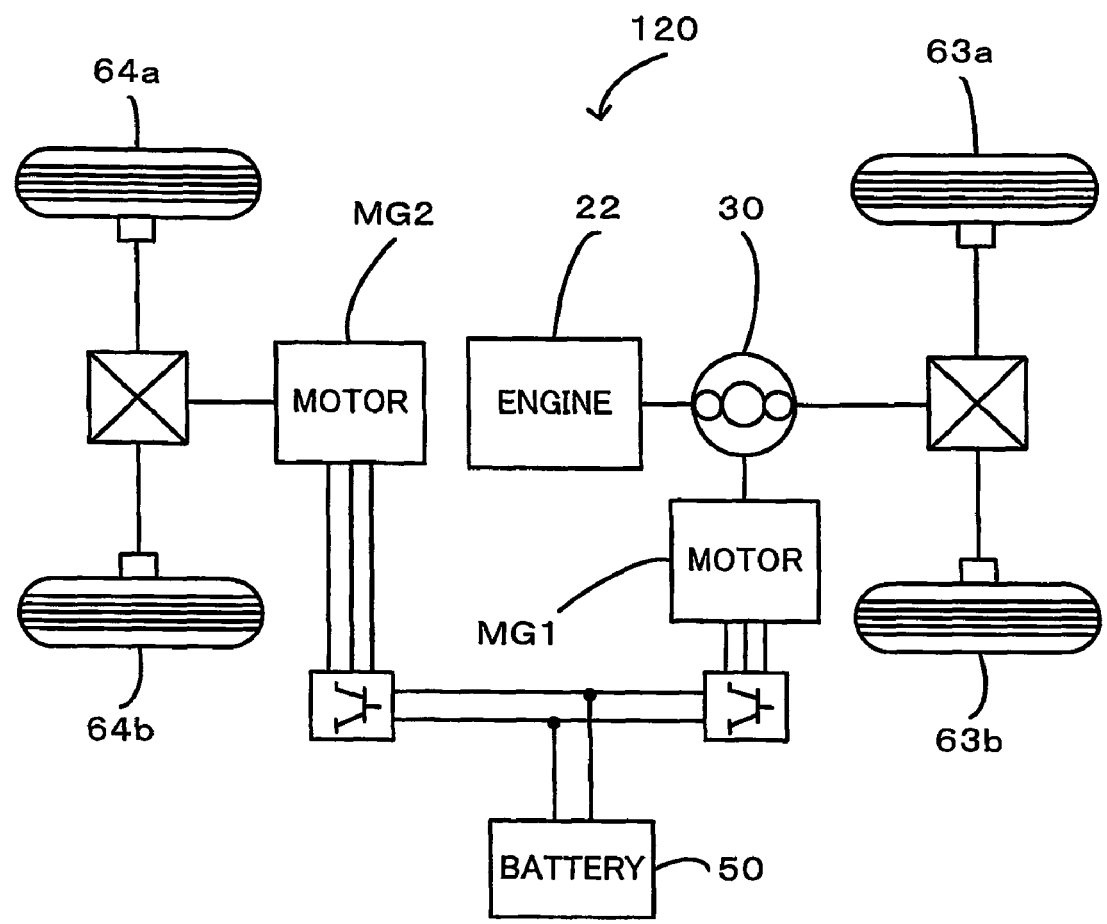
FIG. 8 schematically illustrates the construction of a hybrid vehicle 120 in one modified structure.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 8, the power of the motor MG2 may be output to another axle (that is, an axle linked with wheels 64a and 64b), which is different from an axle connected with the ring gear shaft 32a (that is, an axle linked with the wheels 63a and 63b).

Figure 9:
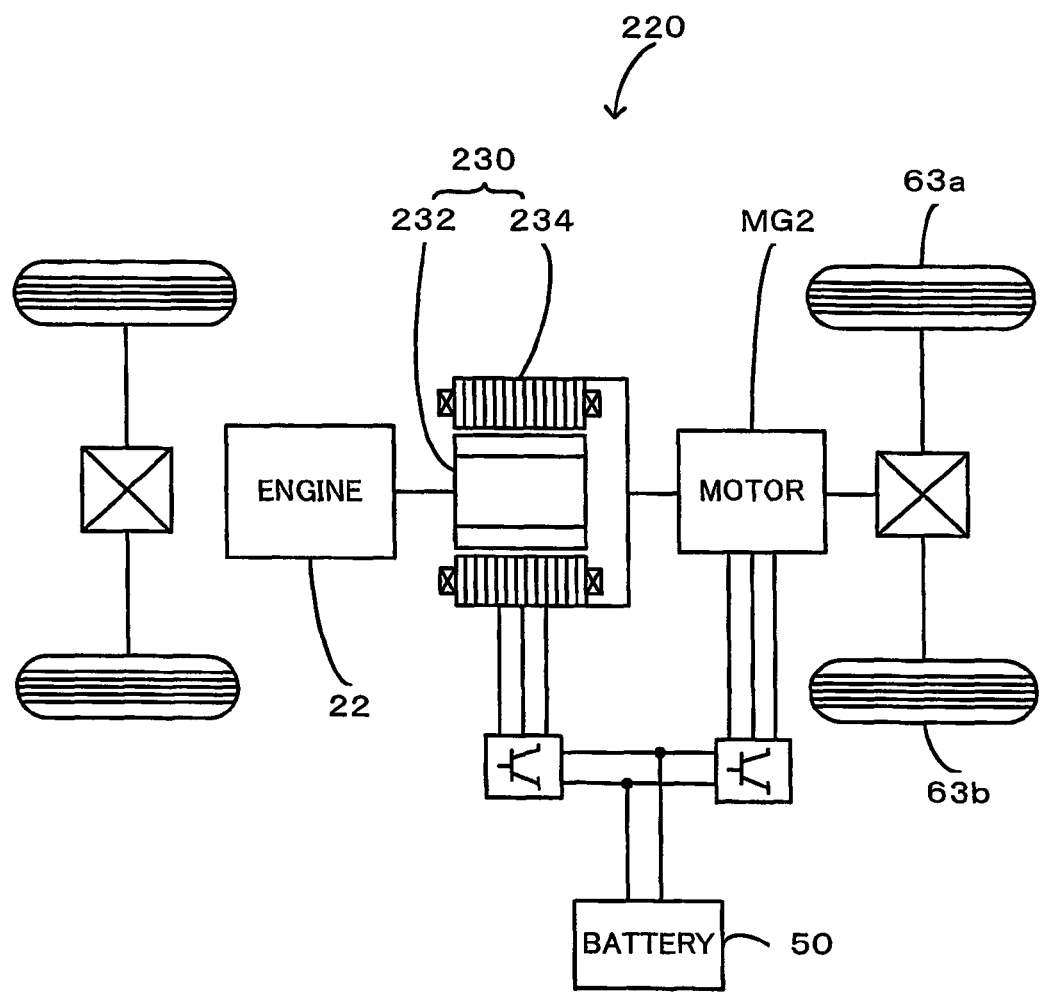
FIG. 9 schematically illustrates the construction of a hybrid vehicle 220 in another modified structure.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 9, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is applicable to manufacturing industries of power output apparatuses and automobiles.

The invention claimed is:

1. A power output apparatus that outputs power to a drive shaft, said power output apparatus comprising:
   an internal combustion engine;
   a three-shaft power input-output assembly that is connected with three shafts, that is, an output shaft of said internal combustion engine, said drive shaft, and a third shaft, and specifies input and output of power from and to one residual shaft among said three shafts, based on powers input and output from and to two shafts among said three shafts;
   a generator that inputs and outputs power from and to said third shaft;
   a motor that is capable of inputting and outputting power from and to said drive shaft;
   an accumulator that is capable of supplying and receiving electric power to and from said generator and said motor;
   an input-output restriction setting module that sets an input restriction and an output restriction of said accumulator using watts as its unit;
   a torque demand setting module that sets a torque demand required for said drive shaft in response to an operator's manipulation;
   a target value setting module that sets a target rotation speed and a target torque of said internal combustion engine by applying a sum of a power demand required for outputting set torque demand to said drive shaft, a charge-discharge power demand required for charging and discharging of said accumulator and a loss to a driving line as an operating restriction of said internal combustion engine set in advance to efficiently operate said internal combustion engine;
   an upper and lower limits of torque setting module that sets an upper and lower limits of torque based on that the sum of the product of a rotation speed of said generator and the upper and lower limits of torque output from said generator, a motor electric power demand to be input to and output from said motor, and auxiliary machinery electric power to be supplied from said accumulator to auxiliary machinery and a loss of the apparatus is equal to set input-output restriction;
   an upper limit variation and lower limit variation setting module that sets upper limit variation and lower limit variation, wherein an increase and decrease amount of rotation speed of said internal combustion engine is set as said upper limit variation and lower limit variation, and the increase and decrease amount of rotation speed of said internal combustion engine is obtained by applying set upper and lower limits of torque to a relational expression for control used when controlling a rotation speed of said internal combustion engine to become set target rotation speed by adjusting a torque output from said generator;

a target rotation speed correction module that sets a true target rotation speed, wherein a rotation speed obtained by correcting set target rotation speed with a rotation speed range is set as said true target rotation speed, and said rotation speed range is obtained by applying set upper limit variation and lower limit variation to the rotation speed of said internal combustion engine;

a generator torque command setting module that sets a torque command for said generator, wherein a torque obtained by applying set target rotation speed to said relational expression for control is set as said torque command for said generator;

a motor torque command setting module that sets a torque command for said motor so that set torque demand is output to said drive shaft within the range of output restriction of set input-output restriction when said generator is driven by set torque command;

a control module that controls said generator, said motor and said internal combustion engine so that said generator is driven with a torque command set by said generator torque command setting module, said motor is driven with a torque command set by said motor torque command setting module and said internal combustion engine is driven with a driving point consisting of the target rotation speed and the target torque set by said target value setting module.

2. A hybrid vehicle, comprising:

an internal combustion engine;

a three-shaft power input-output assembly that is connected with three shafts, that is, an output shaft of said internal combustion engine, a drive shaft mechanically connected to an axle, and a third shaft, and specifies input and output of power from and to one residual shaft among said three shafts, based on powers input and output from and to two shafts among said three shafts;

a generator that inputs and outputs power from and to said third shaft;

a motor that is capable of inputting and outputting power from and to said drive shaft;

an accumulator that is capable of supplying and receiving electric power to and from said generator and said motor;

an input-output restriction setting module that sets an input restriction and an output restriction of said accumulator using watts as its unit;

a torque demand setting module that sets a torque demand required for said drive shaft in response to an operator's manipulation;

a target value setting module that sets a target rotation speed and a target torque of said internal combustion engine by applying a sum of a power demand required for outputting set torque demand to said drive shaft, a charge-discharge power demand required for charging and discharging of said accumulator and a loss to a driving line as an operating restriction of said internal combustion engine set in advance to efficiently operate said internal combustion engine;

an upper and lower limits of torque setting module that sets an upper and lower limits of torque based on that the sum of the product of a rotation speed of said generator and the upper and lower limits of torque output from said generator, a motor electric power demand to be input to and output from said motor, an auxiliary machinery electric power to be supplied from said accumulator to auxiliary machinery and a loss of the apparatus is equal to set input-output restriction;

an upper limit variation and lower limit variation setting module that sets upper limit variation and lower limit variation, wherein an increase and decrease amount of rotation speed of said internal combustion engine is set as said upper limit variation and lower limit variation, and the increase and decrease amount of rotation speed of said internal combustion engine is obtained by applying set upper and lower limits of torque to a relational expression for control used when controlling a rotation speed of said internal combustion engine to become set target rotation speed by adjusting a torque output from said generator;

a target rotation speed correction module that sets a true target rotation speed, wherein a rotation speed obtained by correcting set target rotation speed with a rotation speed range is set as said true target rotation speed, and said rotation speed range is obtained by applying set upper limit variation and lower limit variation to the rotation speed of said internal combustion engine;

a generator torque command setting module that sets a torque command for said generator, wherein a torque obtained by applying set target rotation speed to said relational expression for control is set as said torque command for said generator;

a motor torque command setting module that sets a torque command for said motor so that set torque demand is output to said drive shaft within the range of output restriction of set input-output restriction when said generator is driven by set torque command;

a control module that controls said generator, said motor and said internal combustion engine so that said generator is driven with a torque command set by said generator torque command setting module, said motor is driven with a torque command set by said motor torque command setting module and said internal combustion engine is driven with a driving point consisting of the target rotation speed and the target torque set by said target value setting module.

3. A control method of a hybrid vehicle, said hybrid vehicle comprising:

an internal combustion engine;

a three-shaft power input-output assembly that is connected with three shafts, that is, an output shaft of said internal combustion engine, a drive shaft mechanically connected to an axle, and a third shaft, and specifies input and output of power from and to one residual shaft among said three shafts, based on powers input and output from and to two shafts among said three shafts;

a generator that inputs and outputs power from and to said third shaft;

a motor that is capable of inputting and outputting power from and to said drive shaft;

an accumulator that is capable of supplying and receiving electric power to and from said generator and said motor;

said control method comprising the steps of:

(a) setting an input restriction and an output restriction of said accumulator using watts as its unit;

(b) setting a torque demand required for said drive shaft in response to an operator's manipulation;

(c) setting a target rotation speed and a target torque of said internal combustion engine by applying a sum of a power demand required for outputting set torque demand to said drive shaft, a charge-discharge power demand required for charging and discharging of said accumulator and a loss to a driving line as an operating restriction of said internal combustion engine set in advance to efficiently operate said internal combustion engine;

(d) setting an upper and lower limits of torque based on that the sum of the product of a rotation speed of said generator and the upper and lower limits of torque output from said generator, a motor electric power demand to be input to and output from said motor, an auxiliary machinery electric power to be supplied from said accumulator to auxiliary machinery and a loss of the apparatus is equal to set input-output restriction;

(e) setting upper limit variation and lower limit variation, wherein an increase and decrease amount of rotation speed of said internal combustion engine is set as said upper limit variation and lower limit variation, and the increase and decrease amount of rotation speed of said internal combustion engine is obtained by applying set upper and lower limits of torque to a relational expression for control used when controlling a rotation speed of said internal combustion engine to become set target rotation speed by adjusting a torque output from said generator;

(f) setting a true target rotation speed, wherein a rotation speed obtained by correcting set target rotation speed with a rotation speed range is set as said true target rotation speed, and said rotation speed range is obtained by applying set upper limit variation and lower limit variation to the rotation speed of said internal combustion engine;

(g) setting a torque command for said generator, wherein a torque obtained by applying set target rotation speed to said relational expression for control is set as said torque command for said generator;

(h) setting a torque command for said motor so that set torque demand is output to said drive shaft within the range of output restriction of set input-output restriction when said generator is driven by set torque command;

(i) controlling said generator, said motor and said internal combustion engine so that said generator is driven with a torque command set by said generator torque command setting module, said motor is driven with a torque command set by said motor torque command setting module and said internal combustion engine is driven with a driving point consisting of the target rotation speed and the target torque set by said target value setting module.

* * * * *